United States Patent
Elshaer

(10) Patent No.: US 12,319,156 B2
(45) Date of Patent: Jun. 3, 2025

(54) MAGNETIC INTEGRATION OF HIGH VOLTAGE TO LOW VOLTAGE DC/DC POWER CONVERTER WITH INVERTER SYSTEM CONTROLLER BATTERY CURRENT CONTROL MODULE SYSTEM

(71) Applicant: FORD GLOBAL TECHNOLOGIES, LLC, Dearborn, MI (US)

(72) Inventor: Mohamed Elshaer, Canton, MI (US)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 0 days.

(21) Appl. No.: 18/338,758

(22) Filed: Jun. 21, 2023

(65) Prior Publication Data

US 2024/0424917 A1     Dec. 26, 2024

(51) Int. Cl.
    *H02M 3/335*     (2006.01)
    *B60L 50/51*     (2019.01)
    *B60L 53/24*     (2019.01)
    *H02M 1/00*      (2006.01)
    *H02M 1/44*      (2007.01)

(52) U.S. Cl.
    CPC .............. *B60L 50/51* (2019.02); *B60L 53/24* (2019.02); *H02M 1/0074* (2021.05); *H02M 1/44* (2013.01); *H02M 3/33584* (2013.01); *B60L 2210/10* (2013.01); *B60L 2210/30* (2013.01)

(58) Field of Classification Search
    None
    See application file for complete search history.

(56) References Cited

U.S. PATENT DOCUMENTS

| | | | |
|---|---|---|---|
| 2017/0282747 A1 | 10/2017 | Wang | |
| 2019/0379291 A1* | 12/2019 | Xue | H02M 7/219 |
| 2022/0224236 A1* | 7/2022 | Elshaer | H02M 3/33584 |
| 2022/0286057 A1* | 9/2022 | Zhang | B60L 58/20 |
| 2023/0011289 A1* | 1/2023 | Kim | H02M 1/4233 |
| 2023/0275451 A1* | 8/2023 | Taguchi | H02J 7/00711 |
| | | | 320/129 |
| 2024/0246427 A1* | 7/2024 | Jang | B60L 50/51 |

FOREIGN PATENT DOCUMENTS

| | | |
|---|---|---|
| JP | 2020527321 A | 7/2021 |
| KR | 20210050555 A | 5/2021 |

* cited by examiner

*Primary Examiner* — Jared Fureman
*Assistant Examiner* — Esayas G Yeshaw
(74) *Attorney, Agent, or Firm* — David B. Kelley; Brooks Kushman P.C.

(57) ABSTRACT

An automotive power system includes an AC/DC power converter, a transformer, a switching bridge connected between the AC/DC power converter and transformer, and a switch bank connected with a secondary side of the transformer. The switch bank connects the secondary side between an electric machine and another switching bridge such that the electric machine, first switching bridge, transformer, and second switching bridge form an isolated DC/DC power converter. The system further includes one or more switches configured to directly connect the traction battery between the AC/DC power converter and second switching bridge.

17 Claims, 4 Drawing Sheets

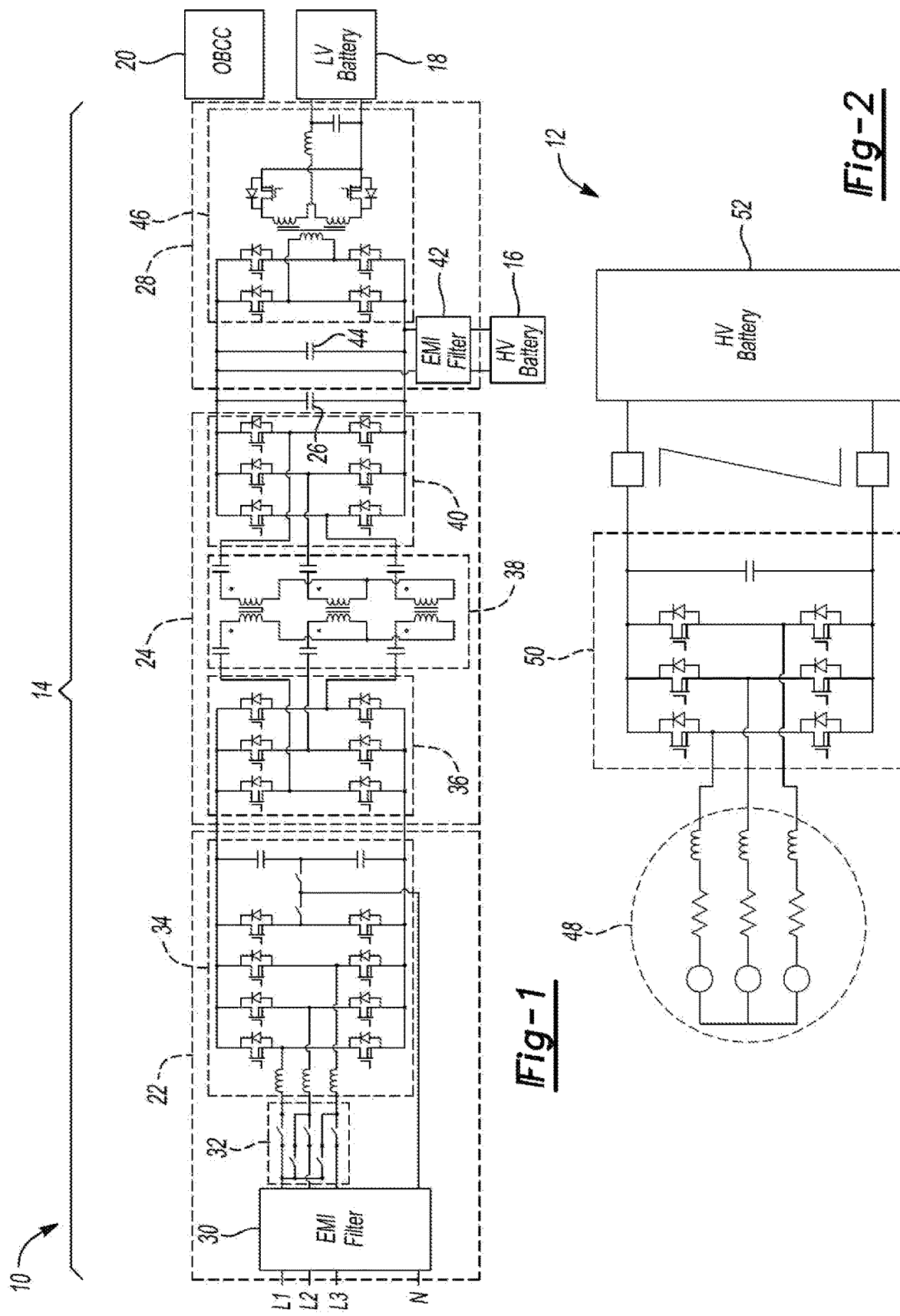

MAGNETIC INTEGRATION OF HIGH VOLTAGE TO LOW VOLTAGE DC/DC POWER CONVERTER WITH INVERTER SYSTEM CONTROLLER BATTERY CURRENT CONTROL MODULE SYSTEM

TECHNICAL FIELD

This disclosure relates to automotive power systems.

BACKGROUND

An automotive vehicle may use electrical energy to power an electric machine. The electric machine may convert this electrical energy to mechanical energy to propel the vehicle. The automotive vehicle may include various power electronics equipment to condition and store the electrical energy.

SUMMARY

An automotive power system includes a traction battery, a first switching bridge, and a circuit arrangement. The circuit arrangement includes an AC/DC power converter, a transformer, a second switching bridge connected between the AC/DC power converter and transformer, and a switch bank connected with an output of the transformer that connects the output with the first switching bridge such that the first switching bridge is connected between the traction battery and transformer, and the first switching bridge, transformer, and second switching bridge form an isolated DC/DC power converter. The system also includes an electromagnetic interference filter, and one or more switches that directly connect the traction battery between the AC/DC power converter and second switching bridge via the electromagnetic interference filter.

A method includes, responsive to a request to charge a traction battery of a vehicle, closing first switches to connect a secondary side of a transformer, having a primary side connected with an AC/DC power converter through a switching bridge, between an electric machine and another switching bridge such that the transformer, electric machine, and switching bridges form an isolated DC/DC power converter that delivers charge power from the AC/DC power converter to the traction battery. The method also includes opening second switches to disconnect the traction battery from the AC/DC power converter.

A vehicle includes an electric machine, a traction battery, a first switching bridge connected between the electric machine and traction battery, an AC/DC power converter, a transformer, a second switching bridge connected between the AC/DC power converter and transformer, and a switch bank connected with a secondary side of the transformer that connects the secondary side between the electric machine and first switching bridge such that the electric machine, first switching bridge, transformer, and second switching bridge form an isolated DC/DC power converter that delivers charge power from the AC/DC power converter to the traction battery. The vehicle also includes an electromagnetic interference filter, and one or more switches that directly connect the traction battery between the AC/DC power converter and second switching bridge via the electromagnetic interference filter.

BRIEF DESCRIPTION OF THE DRAWINGS

FIG. 1 is a schematic diagram of a system including a battery current control module.

FIG. 2 is a schematic diagram of a system including an inverter system controller.

DETAILED DESCRIPTION

Figure 3:
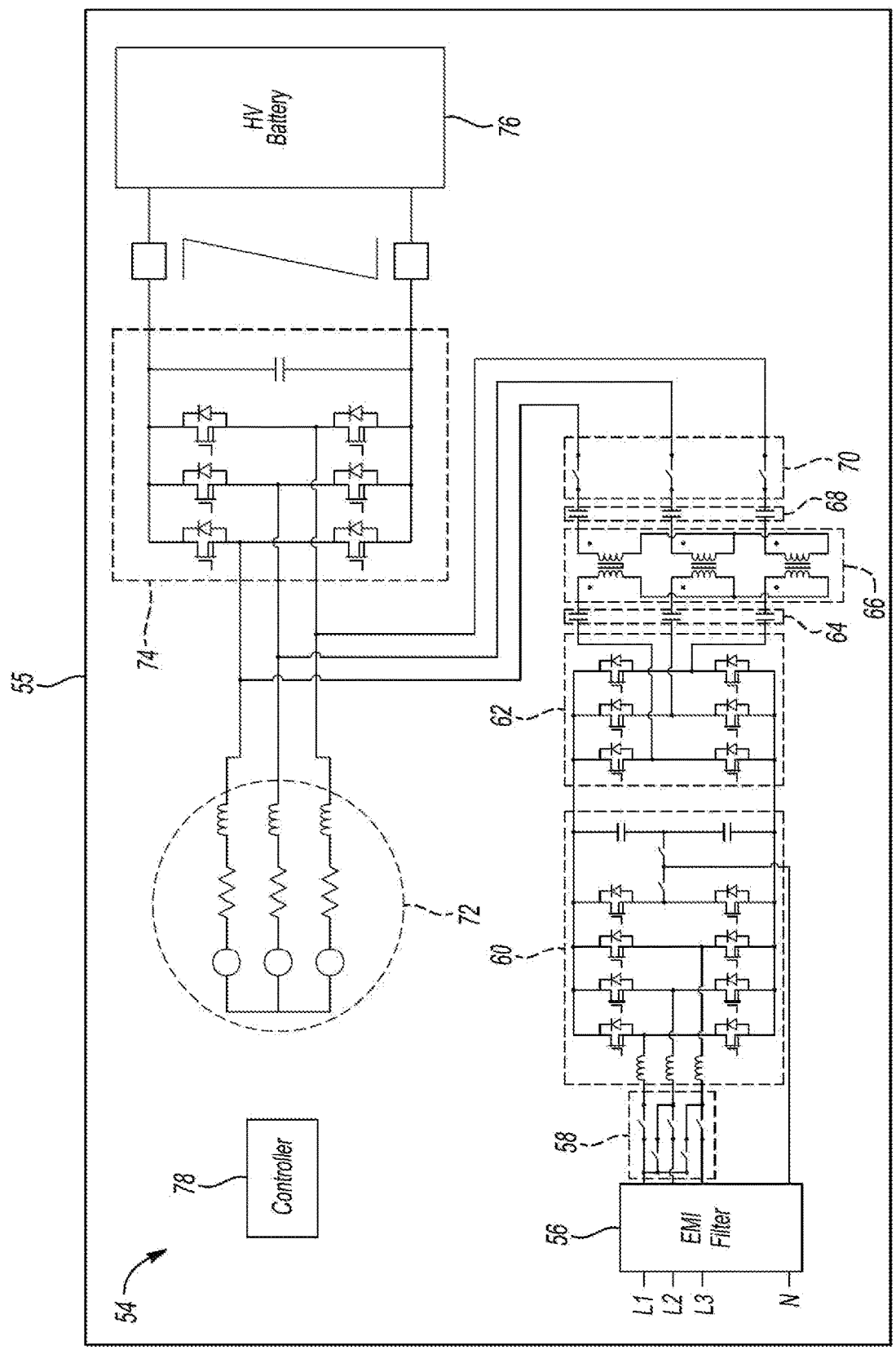
FIG. 3 is a schematic diagram of a system including an integrated battery current control module and inverter system controller.

Embodiments are described herein. It is to be understood, however, that the disclosed embodiments are merely examples and other embodiments may take various and alternative forms. The figures are not necessarily to scale. Some features could be exaggerated or minimized to show details of particular components. Therefore, specific structural and functional details disclosed herein are not to be interpreted as limiting, but merely as a representative basis for teaching one skilled in the art.

Various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Battery current control modules (BCCMs) are components in automotive vehicles, particularly those with electric or hybrid powertrains. These modules play a role in regulating and managing the flow of electric current to and from the battery.

BCCMs function as control units that interface between the battery, the charging system, and the electrical loads. They monitor and control various parameters such as battery state of charge, voltage, and temperature, and based on this information, they regulate the flow of current to the battery.

BCCMs may facilitate charging control by overseeing the charging process of the battery, and managing the voltage and current supplied by the charging system. By monitoring the battery's state of charge and adjusting the charging parameters accordingly, BCCMs attempt to ensure the battery receives the appropriate level of charge to maintain performance.

Similarly, BCCMs may be responsible for discharging control. They can regulate the current output from the battery to the electrical loads in the vehicle. By controlling the current flow, BCCMs may ensure a controlled supply of power to the various electrical components and systems.

BCCMs may also implement various measures for the battery. For instance, they may monitor battery temperature to prevent overheating. They may also detect overvoltage or undervoltage situations and implement measures to avoid short circuits or excessive current draw.

Communication interfaces are often incorporated into BCCMs. These interfaces, such as Controller Area Network (CAN) or LIN (Local Interconnect Network), allow BCCMs to exchange information with other vehicle systems, including the engine control unit (ECU) or the body control module (BCM). This enables coordinated operation and integrated control across various vehicle functions. BCCMs can receive commands or instructions from other control units and adjust current flow accordingly.

BCCMs may feature diagnostic capabilities. These modules can monitor the health and performance of the battery system. They can log codes and provide diagnostic information, facilitating maintenance.

Inverter system controllers (ISCs) are also components in automotive vehicles with electric powertrains. They play a role in managing and controlling the power flow between the battery and electric motor. A function of an inverter system controller is to convert direct current (DC) from the battery into alternating current (AC) to power the electric motor.

ISCs may act as a decision maker for the power electronics system. It may monitor various parameters such as motor speed, torque, and temperature to ensure operation.

A task of ISCs is to convert DC power from the battery into three-phase AC power suitable for the electric motor. It may utilize high-power semiconductor devices, for example insulated-gate bipolar transistors (IGBTs), to control the switching of current and voltage. By modulating the pulse width and frequency of the AC waveform, the inverter system controller regulates the speed and torque output of the electric motor.

ISCs may provide control over the electric motor. They may use algorithms and control strategies to regulate motor speed, torque, and direction of rotation. By adjusting the switching patterns of the IGBTs, the controller can vary the frequency and amplitude of the AC waveform, altering motor operation.

ISCs can facilitate regenerative braking. During deceleration or braking, the electric motor operates as a generator, converting the vehicle's kinetic energy into electrical energy. The inverter system controller may control the flow of energy, directing it back to the battery for storage.

ISCs may be responsible for managing the thermal conditions of the power electronics system. They may monitor the temperature of the inverter and electric motor, and employ cooling systems such as fans, liquid cooling, or heat sinks to dissipate excess heat and maintain operating temperatures.

ISCs may incorporate diagnostic capabilities to detect and protect against faults in the power electronics system. They may monitor various parameters such as voltage, current, and temperature values that could indicate a potential fault. If a fault is detected, the controller may take corrective actions such as shutting down the system, activating other measures, or providing fault codes for diagnostic purposes.

ISCs often feature communication interfaces such as CAN or Ethernet, enabling integration with other vehicle systems. They may exchange information with the main control unit, enabling coordinated operation and facilitating diagnostics and troubleshooting. Communication interfaces also allow the controller to receive commands or instructions from the electronic control unit (ECU) and adjust the power output accordingly.

ISCs may incorporate features such as overvoltage and undervoltage monitoring, overcurrent monitoring, and isolation monitoring.

Integrating the BCCM with the ISC is conventionally considered a challenge due to the disconnecting circuitry. The schematics of typical separate systems 10, 12 are shown in FIGS. 1 and 2, respectively.

Referring to FIG. 1, the system 10 includes a BCCM 14, a traction battery 16, an auxiliary battery 18, and an onboard charge controller 20. The BCCM includes an AC/DC power factor correction circuit 22, an isolated high voltage DC/DC circuit 24, a link capacitor 26, and an isolated high voltage to low voltage DC/DC circuit 28. The isolated high voltage DC/DC circuit 24 is connected between the AC/DC power factor correction circuit 22 and link capacitor 26. The link capacitor 26 is connected between the isolated high voltage DC/DC circuit 24 and the isolated high voltage to low voltage DC/DC circuit 28. The traction battery 16 and auxiliary battery 18 are connected with the isolated high voltage to low voltage DC/DC circuit 28.

The AC/DC power factor correction circuit 22 includes an electro-magnetic interference filter 30, a switch bank 32, and AC/DC power converter circuitry 34. The switch bank 32 is connected between the electro-magnetic interference filter 30 and AC/DC power converter circuitry 34.

The isolated high voltage DC/DC circuit 24 includes a first switching bridge 36, a transformer 38, and a second switching bridge 40. The first switching bridge 36 is directly connected with the power converter circuitry 34. The transformer 38 is connected between the first and second switching bridges 36, 40.

The isolated high voltage to low voltage DC/DC circuit 28 includes an electro-magnetic interference filter 42, a capacitor 44, and high voltage to low voltage power converter circuitry 46. The electro-magnetic interference filter 42 is connected across the capacitor 44 and directly connected to the traction battery 16. The capacitor 44 is connected between the link capacitor 26 and high voltage to low voltage power converter circuitry 46. The high voltage to low voltage power converter circuitry 46 is directly connected to the auxiliary battery 18.

The onboard charge controller 20 is in communication with and/or exerts control over the components illustrated in FIG. 1.

Referring to FIG. 2, the system 12 includes an electric machine 48, an ISC 50, and a traction battery 52. The ISC 50 is connected between the electric machine 48 and traction battery 52.

The ISC 50 has a three-phase inverter designed to drive the electric machine 48 and operates at much higher power than the BCCM 14. The BCCM 14 also has three circuits configured as a three-phase inverter/rectifier. Two disconnect circuits are required to utilize the ISC's three-phase inverter in charging/discharging the traction battery 16. The first disconnect circuit is used to disconnect the electric motor 48 from the ISC 50, and the second disconnect is used to disconnect the ISC 50 from the traction battery 52. The contactors used in these disconnect circuits must carry the ISC's full current. Adding these contactors increases bill of material counts—making electric level integration unfavorable. Package level integration, however, can provide advantages since it reduces the overall package size and/or weight, and the number of connectors and wires. Here, a new circuit topology is proposed that addresses some of the disconnect circuitry's issues. The schematics of such a system 54 is shown in FIG. 3 within the context of vehicle 55.

Referring to FIG. 3, the system 54 includes an electro-magnetic interference filter 56, a switch bank 58, an AC/DC power converter 60, a switching bridge 62, a capacitor bank 64, a transformer 66, a capacitor bank 68, a switch bank 70, an electric machine 72 a switching bridge 74, a traction battery 76, and a controller 78.

The switch bank 58 is connected between the electro-magnetic interference filter 56 and AC/DC power converter 60. The switching bridge 62 is connected between the AC/DC power converter 60 and capacitor bank 64. The transformer 66 is connected between the capacitor banks 64, 68. The capacitor bank 68 is connected between the transformer and switch bank 70. The transformer 66 is thus also connected between the switching bridge 62 and switch bank 70.

The switching bridge 74 is connected between the electric machine 72 and traction battery 76.

The controller 78 is in communication with and/or exerts control over the components illustrated in FIG. 3.

The switch bank 70 is connected with a secondary side of the transformer 66: When switches of the switch bank 70 are closed, the transformer 66 is connected between the electric machine 72 and switching bridge 74 such that the switching bridge 62, transformer 66, electric machine 72, and switching bridge 74 form an isolated DC/DC power converter. The controller 78 may close the switches of the switch bank 70 responsive to a request to charge the traction battery 76. When closed energy received from, for example, a grid received at the electro-magnetic interference filter 56 via L1, L2, L3, and N may be conditioned and transferred through the now formed isolated DC/DC power converter to the traction battery 76. The controller 78 may operate switches of the AC/DC power converter 60 and switching bridges 62, 64, for example, at 300 kHz when the switches of the switch bank 70 are closed (i.e., during charge mode.) When the charge is complete, the controller 78 may open the switches of the switch bank 70. The controller 78 may operate the switches of the switching bridge 64, for example, at 30 kHz (or less) when the switches of the switch bank 70 are open (e.g., during drive mode). Other switch speeds, of course, may be used.

The circuit topology presented in FIG. 3 allows for integrating a BCCM (the electro-magnetic interference filter 56, switch bank 58, AC/DC power converter 60, switching bridge 62, capacitor bank 64, transformer 66, capacitor bank 68, and switch bank 70) with an ISC without using high current contractors. The add-on circuitry is interfaced directly with the ISC without disconnecting the electric machine or traction battery. The add-on circuitry includes a front-end AC/DC power factor correction circuit and portions of the isolated high voltage DC/DC circuit that is part of the BCCM. Three relays are added for disconnecting the add-on circuitry from the ISC during drive mode. The BCCM's high voltage DC/DC circuit can be designed considering the electric machine's stator winding impedance and its variations with respect to rotor position. When the vehicle is plugged into the AC grid, the add-on circuitry, ISC, and electric motor form a bi-directional AC/DC-DC/AC power converter. The BCCM's high voltage DC/DC power converter can be designed to switch at a frequency much higher than the ISC's switching frequency.

Figure 4:
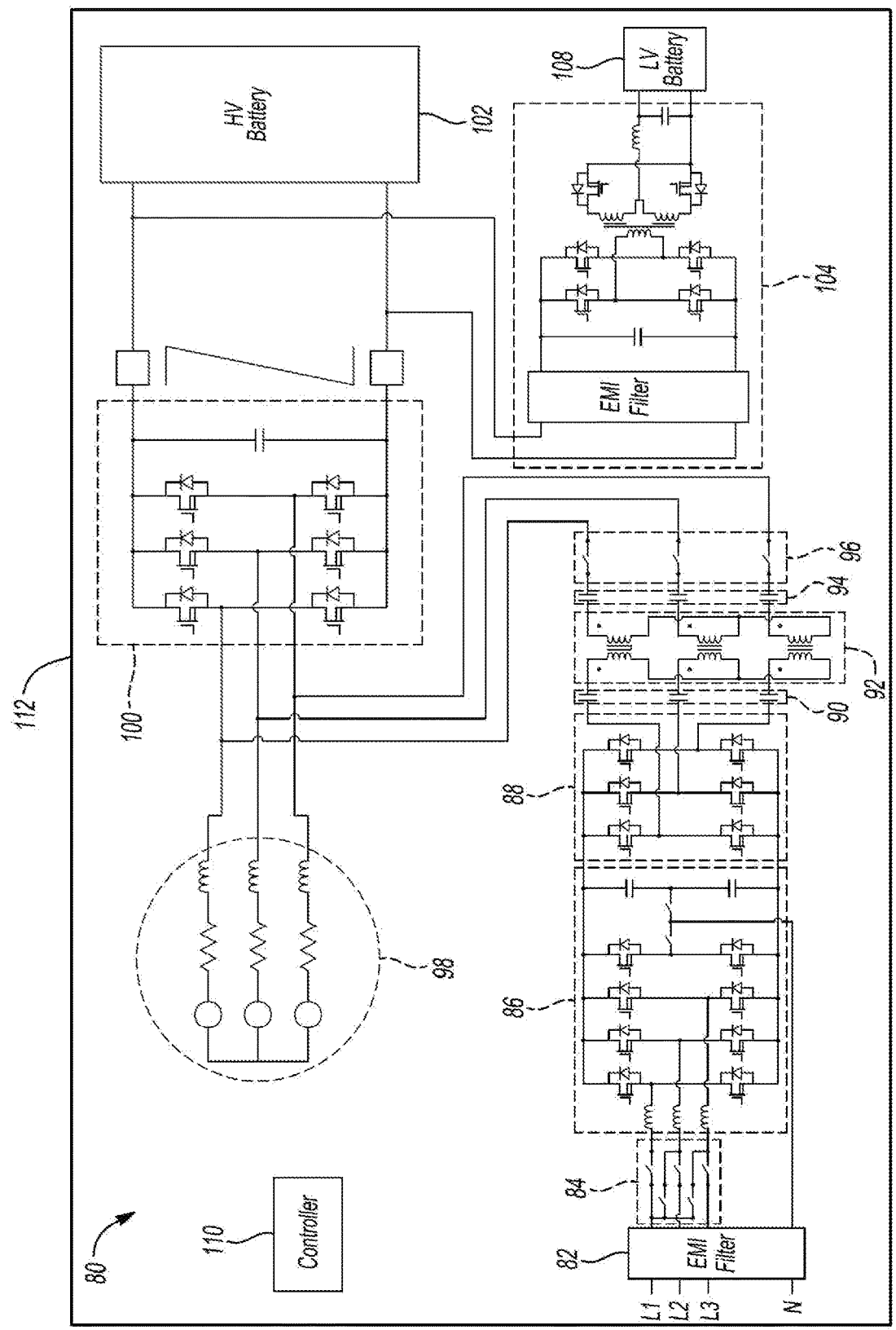
FIG. 4 is a schematic diagram of a system including an integrated battery current control module, inverter system controller, and high voltage to low voltage DC/DC converter.

Referring to FIG. 4, a system 80 includes an electromagnetic interference filter 82, a switch bank 84, an AC/DC power converter 86, a switching bridge 88, a capacitor bank 90, a transformer 92, a capacitor bank 94, a switch bank 96, an electric machine 98, a switching bridge 100, a traction battery 102, a high voltage to low voltage DC/DC power converter 104, an auxiliary battery 106, and a controller 110. These components are shown within the context of vehicle 112. The controller 110 is in communication with and/or exerts control over the components illustrated in FIG. 4.

The electro-magnetic interference filter 82, switch bank 84, AC/DC power converter 86, switching bridge 88, capacitor bank 90, transformer 92, capacitor bank 94, switch bank 96, electric machine 98, switching bridge 100, and traction battery 102 are arranged, and can be operated by the controller 110, in a manner similar to FIG. 3.

The high voltage to low voltage DC/DC power convert 104 is connected between the switching bridge 100 and traction battery 102. It is further connected with the auxiliary battery 108 such that, when the high voltage to low voltage DC/DC power converter 104 is operating, power from the switching bridge 100 may flow through the high voltage to low voltage DC/DC power converter 104 to the auxiliary battery 108.

Integrating the BCCM (the electro-magnetic interference filter 82, switch bank 84, AC/DC power converter 86, switching bridge 88, capacitor bank 90, transformer 92, capacitor bank 94, and switch bank 96) with the inverter system controller (the switch bank 100) is estimated to increase the ISC's package size by 50%. With a larger package size, the module's location may be constrained. Hence, there is a need to reduce packaging size.

The high voltage to low voltage DC/DC power converter 104 contributes to the required packaging space. In some arrangements, the high voltage circuit of the high voltage to low voltage DC/DC power converter 104 consumes almost half of its overall size. The following topology eliminates the high voltage circuit.

Figure 5:
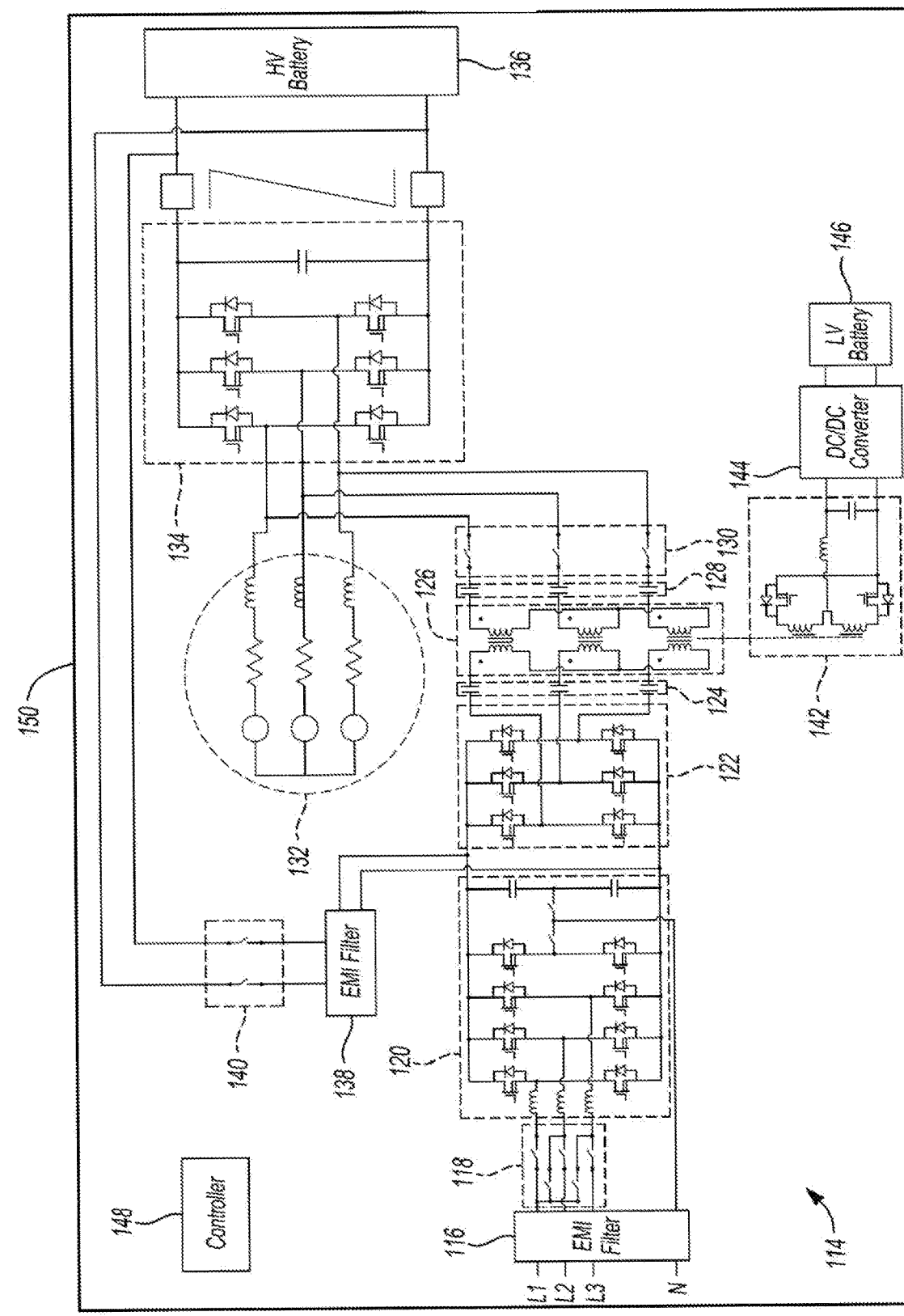
FIG. 5 is a schematic diagram of a system including an integrated battery current control module, inverter system controller, rectifier, and DC/DC converter.

Referring to FIG. 5, a system 114 includes an electromagnetic interference filter 116, a switch bank 118, an AC/DC power converter 120, a switching bridge 122, a capacitor bank 124, a transformer 126, a capacitor bank 128, a switch bank 130, an electric machine 132, a switching bridge 134, a traction battery 136, an electro-magnetic interference filter 138, a switch bank 140, a rectifier 142, a DC/DC power converter, an auxiliary battery 146, and a controller 148. These components are shown within the context of vehicle 150.

The electro-magnetic interference filter 116, switch bank 118, AC/DC power converter 120, switching bridge 122, capacitor bank 124, transformer 126, capacitor bank 128, switch bank 130, electric machine 132, switching bridge 134, and traction battery 136 are arranged in, and can be operated by the controller 148, in a manner similar to FIGS. 3 and 4.

The electro-magnetic interference filter 138 is directly connected between the AC/DC power converter 120 and switch bank 122. The switch bank 140 is arranged to connect the electro-magnetic interference filter 130 directly with the traction battery 136 such that power output from the AC/DC power converter 120 may flow directly to the traction battery 136 via the electro-magnetic interference filter 138 and switch bank 140.

The rectifier 142 is magnetically coupled with the transformer 126 via a low voltage coil and common core. The DC/DC power converter 144 is connected between the rectifier 142 and auxiliary battery 146 such that power from the transformer 142 may flow through the rectifier 142 and DC/DC power converter 144 to the auxiliary battery 146. The DC/DC power converter 144 may provide additional power regulation to the auxiliary battery 146.

The rectifier 142 may be implemented as a center-tap rectifier, a full-bridge rectifier, a half-bridge rectifier, a current doubler, etc. The low voltage coil can be implemented as a center-tap coil or single coil. The rectifier 142 rectifies the voltage induced across the low voltage coil for delivering DC power to the auxiliary battery 146.

As alluded to above, the switch bank 140 electrically connects the traction battery 136 to the BCCM's intermediate DC bus. When the vehicle 150 is disconnected from the AC grid or is in drive mode, all other relays, including the switch bank 130, are open. The BCCM's intermediate DC bus is energized by closing the switch bank 140. An isolated high voltage to low voltage DC/DC power converter is configured for charging the auxiliary battery 146. The transformer's primary windings and low voltage coil are energized for charging/discharging the auxiliary battery 146.

When the vehicle 150 is connected to the AC grid, the controller 148 generates commands such that the switch bank 140 is open, and the switch bank 130 is closed. The switch bank 118 is configured depending on grid type (e.g., single-phase, two-phase, three-phase, etc.). All transformer windings are energized to allow for bidirectional power flow between the AC grid and the traction battery 136, and between the traction battery 136 and auxiliary battery 146.

The algorithms, methods, or processes disclosed herein can be deliverable to or implemented by a computer, controller, or processing device, which can include any dedicated electronic control unit or programmable electronic control unit. Similarly, the algorithms, methods, or processes can be stored as data and instructions executable by a computer or controller in many forms including, but not limited to, information permanently stored on non-writable storage media such as read only memory devices and information alterably stored on writeable storage media such as compact discs, random access memory devices, or other magnetic and optical media. The algorithms, methods, or processes can also be implemented in software executable objects. Alternatively, the algorithms, methods, or processes can be embodied in whole or in part using suitable hardware components, such as application specific integrated circuits, field-programmable gate arrays, state machines, or other hardware components or devices, or a combination of firmware, hardware, and software components.

While exemplary embodiments are described above, it is not intended that these embodiments describe all possible forms encompassed by the claims. The capacitor banks 124, 128 could instead be inductor banks, or capacitor and inductor banks. The symbols used to represent capacitors of the capacitor banks 124, 128 can thus also represent inductors of such inductor banks, or represent capacitors and inductors of such capacitor and inductor banks. The switching bridges 122, 134 may be n-phase inverters or n-phase rectifiers depending on topology and functionality requirements, etc. The switching bridge 122, for example, may be configured as a single phase inverter by removing one of its phase legs.

The words used in the specification are words of description rather than limitation, and it is understood that various changes may be made without departing from the spirit and scope of these disclosed materials. The terms "controller" and "controllers," for example, can be used interchangeably herein as the functionality of a controller can be distributed across several controllers/modules, which may all communicate via standard techniques.

As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to strength, durability, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. An automotive power system comprising:
a traction battery;
a first switching bridge;
a circuit arrangement including an AC/DC power converter, a transformer, a second switching bridge connected between the AC/DC power converter and transformer, and a switch bank connected with an output of the transformer and configured to connect the output with the first switching bridge such that the first switching bridge is connected between the traction battery and transformer, and the first switching bridge, transformer, and second switching bridge form an isolated DC/DC power converter;
an electromagnetic interference filter; and
one or more switches configured to directly connect the traction battery between the AC/DC power converter and second switching bridge via the electromagnetic interference filter.

2. The automotive power system of claim 1 further comprising an auxiliary battery, and a rectifier magnetically coupled with the transformer and connected with the rectifier.

3. The automotive power system of claim 2 further comprising a non-isolated DC/DC power converter connected between the auxiliary battery and rectifier.

4. The automotive power system of claim 1, wherein during charge of the traction battery, switches of the switch bank are closed and the one or more switches are open.

5. The automotive power system of claim 1, wherein after charge of the traction battery, switches of the switch bank are open and the one or more switches are closed.

6. The automotive power system of claim 1 further comprising an electric machine, wherein the first switching bridge is connected between the electric machine and traction battery.

7. The automotive power system of claim 1 further comprising a set of capacitors connected between the first switching bridge and transformer.

8. The automotive power system of claim 7 further comprising a set of inductors connected between the first switching bridge and transformer.

9. A method comprising:
responsive to a request to charge a traction battery of a vehicle,
closing first switches to connect a secondary side of a transformer, having a primary side connected with an AC/DC power converter through a switching bridge, between an electric machine and another switching bridge such that the transformer, electric machine, and switching bridges form an isolated DC/DC power converter configured to deliver charge power from the AC/DC power converter to the traction battery, and
opening second switches to disconnect the traction battery from the AC/DC power converter.

10. The method of claim 9, after completion of the charge, opening the first switches and closing the second switches.

11. A vehicle comprising:
an electric machine;
a traction battery;
a first switching bridge connected between the electric machine and traction battery;
an AC/DC power converter;
a transformer;
a second switching bridge connected between the AC/DC power converter and transformer;
a switch bank connected with a secondary side of the transformer and configured to connect the secondary side between the electric machine and first switching bridge such that the electric machine, first switching bridge, transformer, and second switching bridge form an isolated DC/DC power converter configured to deliver charge power from the AC/DC power converter to the traction battery;
an electromagnetic interference filter; and
one or more switches configured to directly connect the traction battery between the AC/DC power converter and second switching bridge via the electromagnetic interference filter.

12. The vehicle of claim 11 further comprising an auxiliary battery, and a rectifier magnetically coupled with the transformer and connected with the rectifier.

13. The vehicle of claim 12 further comprising a non-isolated DC/DC power converter connected between the auxiliary battery and rectifier.

14. The vehicle of claim 11, wherein during charge of the traction battery, switches of the switch bank are closed and the one or more switches are open.

15. The vehicle of claim 11, wherein after charge of the traction battery, switches of the switch bank are open and the one or more switches are closed.

16. The vehicle of claim 11 further comprising a set of capacitors connected between the first switching bridge and transformer.

17. The vehicle of claim 11 further comprising a set of inductors connected between the first switching bridge and transformer.

* * * * *